United States Patent [19]

Martin

[11] 4,409,120

[45] Oct. 11, 1983

[54] PROCESS FOR FORMING OIL-SOLUBLE PRODUCT

[75] Inventor: Michael K. Martin, Houston, Tex.

[73] Assignee: Shell Oil Company, Houston, Tex.

[21] Appl. No.: 404,191

[22] Filed: Aug. 2, 1982

Related U.S. Application Data

[63] Continuation of Ser. No. 332,692, Dec. 21, 1981, abandoned.

[51] Int. Cl.$^3$ .................................................. C08F 8/04
[52] U.S. Cl. ...................................... 525/280; 252/50;
252/51.5 R; 525/294; 525/338
[58] Field of Search ............... 525/280, 294, 314, 338,
525/351, 376; 252/50, 51.5 R

[56] References Cited

U.S. PATENT DOCUMENTS

| | | | |
|---|---|---|---|
| 3,763,044 | 10/1973 | Anderson | 252/59 |
| 3,772,196 | 11/1973 | St. Clair | 252/32.7 E |
| 4,077,893 | 3/1978 | Kiovsky | 252/56 R |
| 4,085,055 | 4/1978 | Durand | 252/50 |
| 4,116,917 | 9/1978 | Eckert | 260/33.6 AQ |
| 4,141,847 | 2/1979 | Kiovsky | 252/51.5 A |
| 4,358,565 | 11/1982 | Eckert | 525/280 |

Primary Examiner—Paul R. Michl
Attorney, Agent, or Firm—Peter A. Bielinski; Dean F. Vance

[57] ABSTRACT

Lubricating oil additives having both dispersant and viscosity index-improving properties are prepared by contacting a star-shaped polymer having a poly(polyalkenyl aromatic) nucleus, at least three conjugated diene homopolymer or copolymer arms linked to the nucleus, and at least one polymerized nitrogen containing polar compound arm linked to the nucleus, with a rectant selected from p-toluenesulfonylhydrazide and hydrazine under conditions wherein the reactants release $H_2N_2$, which adds across the residual double bonds in the polymer therein hydrogenating the aliphatic unsaturation and releasing $N_2$ gas.

11 Claims, No Drawings

PROCESS FOR FORMING OIL-SOLUBLE PRODUCT

This is a continuation, of application Ser. No. 332,692, filed Dec. 21, 1981, now abandoned.

BACKGROUND OF THE INVENTION

1. Field of the Invention

This invention is directed to a process for making an oil-soluble product useful in lubricating oil compositions. More particularly, this invention is directed to a stoichiometric hydrogenation process for making a star-shaped polymer having the properties of both a viscosity index-improver and a dispersant.

2. Description of the Prior Art

The newer engines place increased demands on the lubricants to be employed. In the past a number of different additives have been added to lubricating oils to improve such properties as viscosity index and dispersancy. One such additive added to lubricating oils to improve viscosity index is a two-block copolymer having the general configuration A-B where A is styrene and B is hydrogenated isoprene. See generally U.S. Pat. Nos. 3,763,044 and 3,772,196. A VI improver having greatly improved mechanical shear stability is the selectively hydrogenated star-shaped polymer disclosed in U.S. Pat. No. 4,116,917.

Significant reductions in cost can be made by employing a single additive that improves a number of lubricant properties. For example, in U.S. Pat. No. 4,141,847 a selectively hydrogenated star-shaped polymer is reacted first with an alpha-beta carboxylic acid, anhydride or ester, and then the product is reacted with an amine to form a dispersant-VI improver. Likewise, in U.S. Pat. No. 4,077,893 a similar product is obtained where an alkane polyol reactant is employed in place of the amine reactant to form a dispersant-VI improver. Still further, in the copending patent application by Rudolf J. Eckert, entitled "Lube Oil Additive", Ser. No. 203,073, filed Oct. 31, 1980, now U.S. Pat. No. 4,358,565, having a common assignee, a hydrogenated star-shaped polymer is reacted with a nitrogen containing polymerizable organic polar compound to form a dispersant-VI improver. The processes to form the above three products all have certain shortcomings. In each of the above described patents, the synthesis process involved an additional step whereby the star-shapd polymer is subjected to either free radical polymerization initiators, such as, tert-butyl hydroperoxide and tert-butyl benzoate or a high temperature condensation reaction between an α-β unsaturated carboxylic acid or derivative and the residual olefin bonds in the star-polymer. The acidic derivatized site would then be reacted with an amine or alkane polyol. The high temperatures required for the free radical process (140° C.) and condensation processes (180°–250° C.) add higher energy requirements for their manufacture and the additional reaction time as well as high temperatures increase the likelyhood of unwanted side-reactions such as cross-linking and chain-scission of the polymer. In each case the addition of a polar molecule, and more specifically a nitrogen-based molecule to the star-polymer backbone allows for the attainment of dispersant properties. Further process difficulties are encountered in controlling the degree of grafting and reproduceability of the functionalization reaction.

A new lube additive has been found that has significantly improved property advantages over the prior art additives.

SUMMARY OF THE INVENTION

The present invention is directed to a process for making an ashless, oil-soluble additive having both dispersant and viscosity index (VI)-improving properties. In particular, the claimed process comprises:

(a) solution polymerizing one or more monomers selected from the group consisting of conjugated dienes and monoalkenyl arenes under polymerization conditions at a temperature between about −75° C. to +150° C. with an organomonolithium compound, therein forming living polymeric arms;

(b) contacting said living polymeric arms with a polyalkenyl aromatic coupling agent at a temperature between about 0° C. and about +150° C., therein forming a coupled polymer having a poly(polyalkenyl aromatic) nucleus and attached polymeric arms;

(c) contacting said coupled polymer with a nitrogen containing polar compound monomer therein attaching poly(nitrogen containing polar compound) arms to said nucleus; and (d) contacting the resulting polymer with a reactant selected from hydrazine and p-toluenesulfonylhydrazide at a temperature between about 50° C. and about 150° C., therein forming $N_2H_2$, which reduces by hydrogenation at least about 80% of the aliphatic unsaturation of said polymeric arms.

The dispersant-VI improvers produced by the process of the present invention possess excellent viscosity improving properties, oxidative stability, mechanical shear stability and dispersancy. The advantages of the above-described process include lower functionalization temperatures, better control of the process and the degree of functionalization, short reaction times, and less polymer degradation such as cross-linking and chain scission. In essence, this process involves terminating the poly(polyalkenyl aromatic) nucleus with a suitable polar compound. This added step is a simple addition to the process of forming the said star-polymers and requires no increased temperatures, extra catalysts or long reaction times to affect the functionalization. Likewise, control over the degree of added polar compound which becomes chemically bonded to the poly(polyalkenyl aromatic) nucleus can be achieved by adjusting the molar ratio of polar compound to alkylithium compound used to polymerize the arms of the star-polymer.

The advantage of the p-toluenesulfonylhydrazide and hydrazine hydrogenation technique is the ability to selectively reduce olefin unsaturation within the block copolymers without excessive degradation (chain-scission, crosslinking) of the polymer chain. Likewise, hydrogenation by this technique is mild and can be achieved in the presence of various functional groups. Specifically the unsaturated portion of the polymer chains containing primary, secondary or tertiary amines can be reduced to at least about 80%. Other functional groups which are rather inert toward the diimide reduction process are double-bonds which contain polar character such as: ($-C\equiv N$, $C=N$, $-C=O$). Hence, the major advantage of the diimide reduction procedure is the selectivity, allowing for the reduction of the olefinic sites within the block-polymer chain, while leaving other polar functional groups intact.

DETAILED DESCRIPTION OF THE INVENTION

Copending patent application Ser. No. 332,690, filed Dec. 12, 1981, entitled "Dispersant-VI Improver Product", claims the dispersant-VI improvers as a composition of matter.

As is well-known, living polymers may be prepared by anionic solution polymerization of conjugated dienes and, optionally, monoalkenyl arene compounds in the presence of an alkali metal or an alkali-metal hydrocarbon, e.g., sodium naphthalene, as anionic initiator. The preferred initiator is lithium or a monolithium hydrocarbon. Suitable lithium hydrocarbons include unsaturated compounds such as allyl lithium, methallyl lithium; aromatic compounds such as phenyllithium, the tolyllithiums, the xylyllithiums and the naphthyllithiums and in particular the alkyl lithiums such as methyllithium, ethyllithium, propyllithium, butyllithium, amyllithium, hexyllithium, 2-ethylhexyllithium and n-hexadecyllithium. Secondary-butyllithium is the preferred initiator. The initiators may be added to the polymerization mixture in two or more stages optionally together with additional monomer. The living polymers are olefinically and, optionally, aromatically unsaturated.

The living polymers obtained by reaction step (a), which are linear unsaturated living polymers, are prepared from one or more conjugated dienes, e.g., $C_4$ to $C_{12}$ conjugated dienes and, optionally, one or more monoalkenyl arene compounds.

Specific examples of suitable conjugated dienes include butadiene(1,3-butadiene); isoprene; 1,3-pentadiene (piperylene); 2,3-dimethyl-1,3-butadiene; 3-butyl-1,3-octadiene, 1-phenyl-1,3-butadiene; 1,3-hexadiene; and 4-ethyl-1,3-hexadiene with butadiene and/or isoprene being preferred. Apart from the one or more conjugated dienes the living polymers may also be partly derived from one or more monoalkenyl arene compounds. Preferred monoalkenyl arene compounds are the monovinyl aromatic compounds such as styrene, monovinylnaphthalene as well as the alkylated derivatives thereof such as o-, m- and p-methylstyrene, alphamethylstyrene and tert-butylstyrene. Styrene is the preferred monoalkenyl arene compound. If a monoalkenyl arene compound is used in the preparation of the living polymers it is preferred that the amount thereof be below about 50% by weight, preferably about 3% to about 50%.

The living polymers may be living homopolymers, living copolymers, living terpolymers, living tetrapolymers, etc. The living homopolymers may be represented by the formula A-M, wherein M is a ionic group, e.g., lithium, and A is polybutadiene or polyisoprene. Living polymers of isoprene are the preferred living homopolymers. The living copolymers may be represented by the formula A-B-M, wherein A-B is a block, random or tapered copolymer such as poly(butadiene/isoprene), poly(butadiene/styrene) or poly(isoprene/styrene). Such formulae, without further restriction, do not place a restriction on the arrangement of the monomers within the living polymers. For example, living poly(isoprene/styrene) copolymers may be living polyisoprene-polystyrene block copolymers, living polystyrene-polyisoprene block copolymers, living poly(isoprene/styrene) random copolymers, living poly(isoprene/styrene) tapered copolymers or living poly(isoprene/styrene/isoprene) block copolymers. As an example of a living terpolymer may be mentioned living poly(butadiene/styrene/isoprene)terpolymers.

As stated above, the living copolymers may be living block copolymers, living random copolymers or living tapered copolymers. The living block copolymers may be prepared by the step-wise polymerization of the monomers, e.g., by polymerizing isoprene to form living polyisoprene followed by the addition of the other monomer, e.g., styrene, to form a living block copolymer having the formula polyisoprene-polystyrene-M, or styrene may be polymerized first to form living polystyrene followed by addition of isoprene to form a living block copolymer having the formula polystyrene-polyisoprene-M.

The living random copolymers may be prepared by adding gradually the most reactive monomer to the polymerization reaction mixture, comprising either the less reactive monomer or a mixture of the monomers, in order that the molar ratio of the monomers present in the polymerization mixture be kept at a controlled level. It is also possible to achieve this randomization by gradually adding a mixture of the monomers to be copolymerized to the polymerization mixture. Living random copolymers may also be prepared by carrying out the polymerization in the presence of a so-called randomizer. Randomizers are polar compounds which do not deactivate the catalyst and bring about a tendency to random copolymerization. Suitable randomizers are tertiary amines, such as trimethylamine, triethylamine, dimethylethylamine, tri-n-propylamine, tri-n-butylamine, dimethylaniline, pyridine, quinoline, N-ethylpiperidine, N-methylmorpholine; thioethers, such as dimethyl sulphide, diethyl sulphide, di-n-propyl sulphide, di-n-butyl sulphide, methyl ethyl sulphide; and in particular ethers, such as dimethyl ether, methyl ethyl ether, diethyl ether, di-n-propyl ether, di-n-butyl ether, di-octyl ether, di-benzyl ether, di-phenyl ether, anisole, 1,2-dimethyloxyethane, o-dimethoxy benzene, and cyclic ethers such as tetrahydrofuran.

Living tapered copolymers are prepared by polymerizing a mixture of monomers and result from the difference in reactivity between the monomers. For example, if monomer A is more reactive than monomer B then the composition of the copolymer gradually changes from that of nearly pure poly-A to that of nearly pure poly-B. Therefore, in each living copolymer molecule three regions can be discerned, which gradually pass into each other, and which have no sharp boundaries. One of the outer regions consists nearly completely of units derived from monomer A and contains only small amounts of units derived from monomer B, in the middle region the relative amount of units derived from monomer B greatly increases and the relative amount of units derived from monomer A decreases, while the other outer region consists nearly completely of units derived from monomer B and contains only small amounts of units derived from monomer A. Living tapered copolymers of butadiene and isoprene are preferred living tapered polymers.

Since the living polymers produced in reaction step (a) of the above process are the precursors of the hydrogenated polymer chains which extend outwardly from the poly(polyalkenyl coupling agent)nucleus, it can be seen that the preferred hydrogenated polymer chains are hydrogenated polybutadiene chains, hydrogenated polyisoprene chains, hydrogenated poly(butadiene/isoprene)chains, hydrogenated poly(butadiene/styrene)-chains and hydrogenated poly(isoprene/styrene)chains.

The solvents in which the living polymers are formed are inert liquid solvents such as hydrocarbons, e.g., aliphatic hydrocarbons, such as pentane, hexane, heptane octane, 2-ethylhexane, nonane, decane, cyclohexane, methylcyclohexane or aromatic hydrocarbons, e.g., benzene, toluene, ethylbenzene, the xylenes, diethylbenzenes, propylbenzenes. Cyclohexane is preferred. Mixtures of hydrocarbons, e.g., lubricating oil may also be used.

The temperature at which the polymerization is carried out may vary between wide limits such as from $-75°$ C. to 150° C., preferably from about 20° C. to about 80° C. The reaction is suitably carried out in an inert atmosphere such as nitrogen and may be carried out under pressure, e.g., a pressure of from about 0.5 to about 10 bars.

The concentration of the initiator used to prepare the living polymer may also vary between wide limits and is determined by the desired molecular weight of the living polymer.

The molecular weight of the living polymers prepared in reaction step (a) may vary between wide limits. Suitable number average molecular weights are from about 5,000 to about 150,000 with number average molecular weights of from about 15,000 to about 100,000 being preferred. Consequently, the number average molecular weight of the hydrogenated polymers chains of the final star-shaped polymer may also vary between these limits.

The living polymers produced in reaction step (a) are then reacted, in reaction step (b), with a polyalkenyl coupling agent. Polyalkenyl coupling agents capable of forming star-shaped polymers are known. See generally, Fetters et al., U.S. Pat. No. 3,985,830; Milkovich, Canadian Pat. No. 716,645; and British Pat. No. 1,025,295. They are usually compounds having at least two non-conjugated alkenyl groups. Such groups are usually attached to the same or different electron-withdrawing groups, e.g., an aromatic nucleus. Such compounds have the property that at least two of the alkenyl groups are capable of independent reaction with different living polymers and in this respect are different from conventional conjugated diene polymerizable monomers such as buadiene, isoprene, etc. Pure or technical grade polyalkenyl coupling agents may be used. The preferred coupling agents are polyalkenyl aromatic compounds and the most preferred are the polyvinyl aromatic compounds. Examples of such compounds include those aromatic compounds, e.g., benzene, toluene, xylene, anthracene, naphthalene and durene which are substituted by at least two alkenyl groups preferably directly attached thereto. Examples include the polyvinyl benzenes, e.g., divinyl, trivinyl and tetravinyl benzenes; divinyl, trivinyl and tetravinyl ortho-, meta- and para-xylenes, divinyl naphthalene, divinyl ethy benzene, divinyl biphenyl, diisobutenyl benzene, diisopropenyl benzene and diisopropenyl biphenyl. The preferred aromatic compounds are represented by the formula: $A(CH=CH_2)_x$ wherein A is an optionally substituted aromatic nucleus and x is an integer of at least 2. Divinyl benzene, in particular metadivinyl benzene, is the most preferred aromatic compound. Pure or technical grade divinylbenzene (containing various amounts of other monomers, e.g. styrene and ethyl styrene) may be used. The coupling agent may be used in admixture with small amounts of added monomers which increase the size of the nucleus, e.g., styrene or alkylated styrene. In this case, the nucleus may be described as a poly(dialkenyl coupling agent/monoalkenyl aromatic compound)nucleus, e.g., a poly(divinylbenzene/monoalkenyl aromatic compound)nucleus. From the above it will be clear that the term divinylbenzene when used to describe the nucleus means either purified or technical grade divinyl benzene.

The polyalkenyl coupling agent should be added to the living polymer after the polymerization of the monomers is substantially complete, i.e., the agent should only be added after substantially all of the diene and monoalkenyl arene monomer has been converted to living polymers.

The amount of polyalkenyl coupling agent added may vary between wide limits but preferably at least 0.5 mole is used per mole of unsaturated living polymer. Amounts of from 1 to 15 moles, preferably from 1.5 to 5 moles are preferred. The amount, which may be added in two or more stages, is usually such as to convert at least 80 or 85% w of the living polymers into star-shaped polymers.

The reaction step (b) may be carried out in the same solvents as for reaction step (a). A list of suitable solvents is given above. The reaction step (b) temperature may also vary between wide limits, e.g., from 0° to 150° C., preferably from 20° to 120° C. The reaction may also take place in an inert atmosphere, e.g., nitrogen and under pressure, e.g., a pressure of from 0.5 to 10 bars.

The star-shaped polymers prepared in reaction step (b) are characterized by having a dense center or nucleus of cross-linked poly(polyalkenyl coupling agent) and a number of arms of substantially linear unsaturated polymers extending outwardly therefrom. The number of arms may vary considerably but is typically between 3 and 25, preferably from about 7 to about 15. Star-shaped homopolymers may be represented by the formula $A\text{-}(\text{-}x\text{-}A)_n$ and star-shaped copolymers may be represented by the formula $A\text{-}B\text{-}x(B\text{-}A)_n$ wherein n is an integer, usually between 2 and 24 and x is the poly(polyalkenyl coupling agent)nucleus. From the above it can be seen that x is preferably a poly(polyvinyl aromatic coupling agent)nucleus and more preferably a poly(divinylbenzene)nucleus. As stated above it is believed that the nuclei are cross-linked.

It has been found that the greater number of arms employed in the instant invention significantly improve both the thickening efficiency and the shear stability of the polymer since it is then possible to prepare a VI improver having a high molecular weight (resulting in increased thickening efficiency) without the necessity of excessively long arms (resulting in improved shear stability).

In the next step, the star-shaped polymer is contacted with a nitrogen containing polar compound monomer, resulting in the attachment of at least one polymer arm directly to the poly(polyvinyl aromatic)nucleus. The nitrogen containing polar compound is preferably selected from the group consisting of 2-vinylpyridine and 4-vinylpyridine, with 2-vinylpyridine being most preferred. However, other polymerizable nitrogen-bearing compounds are also contemplated in the present invention, including, by way of example: 2-methyl, 5-vinyl pyridine; acrylamide; methacrylamides; N-alkyl acrylamide; N,N-dialkyl acrylamides; N,N-dialkylmethacrylamides, where the alkyl group contains from one to seven carbon atoms. Other polymerizable nitrogen bearing compounds are: N-vinyl imidazole and N-vinyl carbazole; ε-caprolactam; N-vinyl-oxazolidone; N-vinylcaprolactam; N-vinylthiocaprolactam; and N-vinylpyrrolidone. Non-polymerizable nitrogen heterocycles can also be added with the polymerizable nitrogen containing polar compound to give the desired functionality including: piperidine, pyrrolidine, morpholine, pyridine, aziridine, pyrrole, indole, pyridazine, quinoline and isoquinoline, pyridazine, pyrimidine, pyrazine and derivatives and polypyridines having less than 20 pyridyl groups such as 2,2'-bipyridine and tripyridine, etc.

In the interests of simplicity, the remainder of the specification shall refer to vinylpyridine instead of nitrogen containing polar compound.

After contacting the star-shaped polymer with the vinylpyridine monomer, the resulting star-shaped copolymer contains about 0.1 to about 10 percent by weight vinylpyridine, preferably about 0.1 to about 5.0 percent by weight. The number of poly(vinylpyridine) arms is typically between one and about 10, preferably between one and about 5. Accordingly, the molecular weight of the poly(vinylpyridine) arms is between about 105 and about 10,000, preferably between about 105 and about 1000.

The addition of the polar compound, preferably 2-vinylpyridine, to the poly(polyalkenyl aromatic)nucleus occurs at temperatures between −78° C. and +80° C., preferably between 25° C. and 60° C.

The molecular weights of the star-shaped polymer to be hydrogenated may vary between relatively wide limits. However, an important aspect of the present invention is that polymers possessing good shear stability may be produced even though the polymers have very high molecular weights. It is possible to produce star polymers having peak molecular weights between about 25,000 and about 1,250,000. Preferred molecular weights are 100,000 to 500,000. These peak molecular weights are determined by gel permeation chromotography (GPC) on a polystyrene scale.

In step (d), the star-shaped polymers are hydrogenated by the presently claimed stoichiometric (non-catalytic) hydrogenation technique. Suitably at least 80%, preferably 90 to about 98% of the original olefinic unsaturation is hydrogenated. If the star-shaped polymer is partly derived from a monoalkenyl arene compound, then the amount of aromatic unsaturation which is hydrogenated, if any, will depend on the hydrogenation conditions used. However, preferably less than 20%, more preferably less than 5% of such aromatic unsaturation is hydrogenated. If the poly(polyalkenyl coupling agent) nucleus is a poly(polyalkenyl aromatic coupling agent)nucleus, then the aromatic unsaturation of the nucleus may or may not be hydrogenated again depending upon the hydrogenation conditions used. The molecular weights of the hydrogenated star-shaped polymers correspond to those of the unhydrogenated star-shaped polymers. The hydrogenation of the olefinic unsaturation is important with regard to the thermal and oxidative stability of the product.

The hydrogenation of the star-shaped polymer is very suitably conducted in solution in a solvent which is inert during the hydrogenation reaction. Saturated hydrocarbons and mixtures of saturated hydrocarbons are very suitable. These solvents include cyclohexane, hexane, benzene, toluene, meta-, ortho- and para-xylenes or mixtures thereof. Most preferably, xylenes are used as the hydrogenation solvent.

Without wishing to be bound to a particular theory, it is considered that in this stoichiometric hydrogenation, the reactant thermally decomposes, resulting in the formation of a diimide which serves as the actual hydrogenating agent. Next, the diimide quickly undergoes a concerted cis-addition to the polymer aliphatic double bonds affecting the hydrogenation, while releasing nitrogen as the gaseous by-product. The reactants employed herein include p-toluenesulfonylhydrazide (PTSH) and hydrazine, with PTSH being preferred.

The mechanism of the hydrogenation step can be envisioned as follows, with PTSH as the reactant:

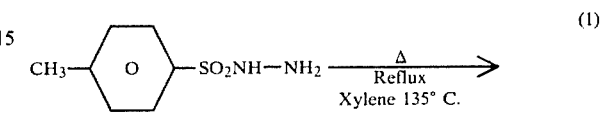

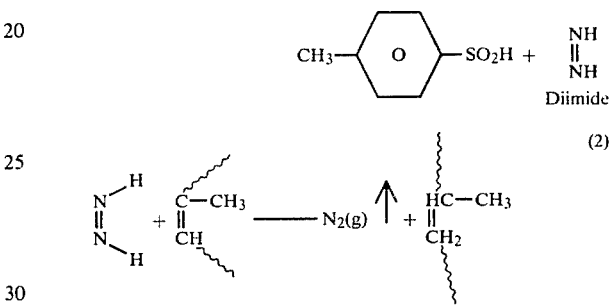

The temperature during the reactant decomposition stage is between about 50° C. and about 150° C., preferably between about 80° C. and 135° C. The molar ratio of PTSH or hydrazine reactant to conjugated diene units (aliphatic unsaturation bonds) is typically between about 5:1 and about 1:1, preferably between about 3:1 and about 1:1.

The hydrogenated star-shaped polymer is then recovered in solid form from the solvent in which it is hydrogenated by any convenient technique such as by evaporation of the solvent. Alternatively, an oil, e.g., a lubricating oil, may be added to the solution and the solvent stripped off from the mixture so formed to produce concentrates. Easily handleable concentrates are produced even when the amount of hydrogenated star-shaped polymer therein exceeds 10% w. Suitable concentrates contain from 10 to 25% w of the hydrogenated star-shaped polymer.

The reaction product of this invention can be incorporated in lubricating oil compositions, e.g., automotive crankcase oils, in concentrations within the range of about 0.1 to about 15, preferably about 0.1 to 3, weight percent based on the weight of the total compositions. The lubricating oils to which the additives of the invention can be added include not only mineral lubricating oils, but synthetic oils also. Synthetic hydrocarbon lubricating oils may also be employed, as well as non-hydrocarbon synthetic oils including dibasic acid esters such as di-2-ethyl hexyl sebacate, carbonate esters, phosphate esters, halogenated hydrocarbons, polysilicones, polyglycols, glycol esters such as $C_{13}$ oxo acid diesters of tetraethylene glycol, etc. When used in gasoline or fuel oil, e.g., diesel fuel, No. 2 fuel oil, etc., then usually about 0.001 to 0.5 weight percent, based on the weight of the total composition of the reaction product will be used. Concentrations comprising a minor proportion, e.g., 15 to 45 weight percent, of said reaction product in a major amount of hydrocarbon diluent, e.g., 85 to 55 weight percent mineral lubricating oil, with or without other additives present, can also be prepared for ease of handling.

In the above compositions or concentrates, other conventional additives may also be present, including dyes, pour point depressants, antiwear agents, e.g., tricresyl phosphate, zinc dialkyl dithiophosphates of 3 to 8 carbon atoms, antioxidants such as phenyl-alpha-naphthylamine, tert-octylphenol sulfide, bis-phenols such as 4,4'-methylene bis(3,6-di-tert-butylphenol), viscosity index improvers such as the ethylene-higher olefin copolymer, polymethylacrylates, polyisobutylene, alkyl fumaratevinyl acetate copolymers, and the like as well as other ashless dispersants or detergents such as overbased sulfonates.

The invention is further illustrated by means of the following Illustrative Embodiments, which are given for the purpose of illustration alone, and are not meant to limit the invention to the particular reactants and amounts disclosed.

ILLUSTRATIVE EMBODIMENT I

A 2-liter glass-bowl reactor equipped with a stirrer and appropriate temperature control was utilized for the synthesis of the star-shaped poly(isoprene) and the dispersant VI-improver. Anionic polymerization techniques were employed and all reagents such as: monomers, solvents, initiators, etc. were dry and of high purity. The polymerization was achieved under an inert gas such as argon or nitrogen in order to avoid contamination with the atmosphere.

The reactor was charged with 1170 grams of cyclohexane and heated to 35° C. A small amount of 1,1-diphenylethylene was then added to serve as an indicator for the subsequent titration.

Incremental additions of sec-butyllithium were introduced into the reactor until a permanent yellow color was reached. This served as an indicator that all impurities had been scavenged from the system. The solution was then back titrated with solvent until the yellow color had just disappeared. The required amount of initiator was then charged, which was calculated to be $5.7 \times 10^{-3}$ moles of sec-butyllithium. To this solution was then added 294 mls of isoprene monomer. The reaction was allowed to exotherm to 60° C., where the polymerization continued for 2 hours. To the living poly(isoprene) was next added 0.028 moles of commercial divinylbenzene, such that the molar ratio of divinylbenzene to sec-RLi was 5:1. The reaction was allowed to proceed for 1-2 hours at 60° C. The solution turned deep red after addition of the divinylbenzene. This divinylbenzene coupling formed the star-shaped poly(isoprene). After the coupling step, 0.87 grams of 2-vinylpyridine was added to the solution giving the polymer a chemically bonded polar group. The polymer was then precipitated into a large excess of ispropanol, filtered, and dried in a vacuum oven until a constant weight was obtained.

Analysis of the polymer by Kjeldahl nitrogen analysis indicated the polymer contained from 350 to 450 ppm nitrogen. This corresponds to around 0.5 wt % 2-vinylpyridine in the polmyer.

G.P.C. analysis of the polymer revealed the number-average arm molecular weight ($\overline{M}_n$) to be 38,000 and the functionality was observed to be around 9-10 arms. The polymer was stabilized with Ionol and stored until needed for subsequent hydrogenation.

STOICHIOMETRIC HYDROGENATION

Hydrogenation of the 2-vinylpyridine functionalized star-shaped poly(isoprene) was achieved with para-toluenesulfonylhydrazide in refluxing xylene. A one-liter, four-necked reaction flask, fitted with a condensor, nitrogen inlet, thermometer, and sample port was assembled and heated with a silicone oil bath.

The reaction flask was charged with 300 mls of xylene, to which was added 5 grams of polymer. The reactor was heated to 60° C. to aid polymer dissolution. Once the temperature had stabilized, 0.304 moles of para-toluenesulfonylhydrazide was added thru a powder funnel to the reaction. This amounts to a 4 to 1 molar ratio of para-toluenesulfonylhydrazide to polymer double bonds. The reaction medium was then heated to the reflux temperature of xylene (130°-135° C.) and allowed to react for 5 hours. The hydrogenated product was recovered by filtering the hot xylene solution, followed by coagulation of the polymer solution in isopropanol. The polymer was washed several times with hot water and isopropanol to remove any unreacted by-products. The polymer was then dried overnight in a vacuum oven at 50° C.

Analysis of the polymer by an $O_3$ titration technique, resulted in a 98% yield for the degree of hydrogenation. G.P.C. analysis of the polymer after hydrogenation likewise indicated that no polymer degradation took place during the reaction.

What is claimed is:

1. A process for preparing an oil-soluble, star-shaped product, said process comprising:
   a. solution polymerizing one or more conjugated diene monomers and optionally one or more monoalkenyl arene monomers under polymerization conditions at a temperature between about −75° C. to +150° C. with an organomonolithium compound, therein forming living polymeric arms;
   b. contacting said living polymeric arms with a polyalkenyl aromatic coupling agent at a temperature between about 0° C. and about +150° C., therein forming a coupled polymer having a poly(polyalkenyl aromatic) nucleus and attached polymeric arms;
   c. contacting said coupled polymer with a nitrogen containing polar compound monomer therein attaching poly(nitrogen containing polar compound) arms to said nucleus; and
   d. contacting the resulting polymer with a reactant selected from the group consisting of hydrazine and p-toluenesulfonylhydrazide at a temperature between about 50° C. and about 150° C., therein forming $N_2H_2$, which reduces by hydrogenation at least about 80% of the aliphatic unsaturation of said polymeric arms.

2. The process of claim 1 wherein the monomers of step (a) are selected from the group consisting of butadiene, isoprene and styrene.

3. The process of claim 2 wherein said monomers are selected from the group consisting of butadiene, isoprene and mixtures thereof.

4. The process of claim 3 wherein said monomer is isoprene.

5. The process of claim 1 wherein said polyalkenyl aromatic coupling agent is divinylbenzene.

6. The process of claim 1 wherein said nitrogen containing polar compound is selected from the group consisting of 2-vinylpyridine and 4-vinylpyridine.

7. The process of claim 6 wherein said nitrogen containing polar compound is 2-vinylpyridine.

8. The process of claim 6 wherein said nitrogen containing polar compound is contacted with said coupled polymer at a temperature between about −78° C. and +80° C.

9. The process of claim 1 wherein said monomer of step (a) is isoprene, said polyalkenyl aromatic coupling agent is divinylbenzene, and said nitrogen containing polar compound is 2-vinylpyridine.

10. The process of claim 1 or claim 9 wherein said reactant is p-toluenesulfonylhydrazide.

11. The process of claim 1 wherein the molar ratio of reactant in step (d) to conjugated diene units is between about 5:1 and about 1:1.

* * * * *